US011113865B2

(12) United States Patent
Cheong et al.

(10) Patent No.: US 11,113,865 B2
(45) **Date of Patent: *Sep. 7, 2021**

(54) THREE-DIMENSIONAL GENERATIVE DESIGN BASED ON TWO-DIMENSIONAL SKETCHING

(71) Applicant: AUTODESK, INC., San Rafael, CA (US)

(72) Inventors: Hyunmin Cheong, Toronto (CA); George Fitzmaurice, Toronto (CA); Tovi Grossman, Toronto (CA); Rubaiat Habib Kazi, Toronto (CA); Ali Baradaran Hashemi, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,269

(22) Filed: Jul. 23, 2019

(65) Prior Publication Data

US 2019/0347844 A1 Nov. 14, 2019

Related U.S. Application Data

(63) Continuation of application No. 15/784,051, filed on Oct. 13, 2017.

(Continued)

(51) Int. Cl.

*G06T 15/00* (2011.01)
*G06T 15/02* (2011.01)

(Continued)

(52) U.S. Cl.

CPC ................ *G06T 15/02* (2013.01); *G06T 7/00* (2013.01); *G06T 11/00* (2013.01); *G06T 17/00* (2013.01);

(Continued)

(58) Field of Classification Search

CPC .. G06T 19/00; G06T 19/20; G06T 2219/2021

(Continued)

(56) References Cited

U.S. PATENT DOCUMENTS

| | | | |
|---|---|---|---|
| 6,803,928 | B2 | 10/2004 | Bimber et al. |
| 7,099,803 | B1 | 8/2006 | Rappoport et al. |

(Continued)

OTHER PUBLICATIONS

Kulisiewicz, Maciej. Modeling and identification of nonlinear mechanical systems under dynamic complex loads. Oficyna Wydawnicza Politechniki WrocĹ ,awskiej, 2005.*

(Continued)

*Primary Examiner* — Phu K Nguyen
(74) *Attorney, Agent, or Firm* — Artegis Law Group, LLP

(57) ABSTRACT

One embodiment of the present invention provides a technique for generating a three-dimensional model from a two-dimensional sketch. The technique includes receiving input indicating a set of points defining a first sketch element and a second set of points defining a second sketch element included in a sketch. The technique further includes identifying one or more design relationships between the first sketch element and the second sketch element. The technique further includes generating a computer model of the sketch that represents a structure linking the first sketch element and the second sketch element according to the one or more design relationships. The technique further includes outputting the first sketch element, the second sketch element, and the structure for display.

17 Claims, 8 Drawing Sheets

230
220
210
240
250
230
220
210

Related U.S. Application Data

(60) Provisional application No. 62/563,044, filed on Sep. 25, 2017.

(51) Int. Cl.
*G06T 19/20* (2011.01)
*G06T 11/00* (2006.01)
*G06T 17/00* (2006.01)
*G06T 7/00* (2017.01)

(52) U.S. Cl.
CPC .......... *G06T 19/20* (2013.01); *G06T 2200/08* (2013.01); *G06T 2200/24* (2013.01)

(58) Field of Classification Search
USPC .................................................. 345/419, 418
See application file for complete search history.

(56) References Cited

U.S. PATENT DOCUMENTS 7,639,250 B2 12/2009 Xu et al.
7,647,210 B2 1/2010 Wang et al.
8,248,407 B2 8/2012 Deslandes
8,892,404 B2 11/2014 Potter et al.
9,149,309 B2 10/2015 Paczkowski et al.
9,384,591 B2 7/2016 Hurt et al.

OTHER PUBLICATIONS

Walden, Bicycle Frame—Quick & Dirty—Autocad 2017 Training , Mar. 10, 2017, https://www.youtube.com/watch?v=a-PJ-mOnf-I.*
Habbecke M, Kobbelt L. Linear analysis of nonlinear constraints for interactive geometric modeling. InComputer Graphics Forum May 2012 (vol. 31, No. 2pt3, pp. 641-650). Oxford, UK: Blackwell Publishing Ltd.*
Hageman & Company, Inc, Understanding Linear and Non Linear FEA Using Inventor Nastran, Dec. 9, 2016, https://www.youtube.com/watch?v=OnD77vjslc4.*
Rundo et al, Lumped Parameters Model of a Crescent Pump, Dipartimento Energia, Politecnico di Torino, Turin, Italy, Energies, MDPI, Oct. 2016.*
Zeleznik et al., "SKETCH: An interface for sketching 3D scenes", In ACM SIGGRAPH, Courses, Aug. 2007, 6 pages.
Kyratzi S, Sapidis N. An interactive sketching method for 3D object modeling. In Proceedings of the 3rd international conference on Digital Interactive Media in Entertainment and Arts Sep. 10, 2008 (pp. 335-342). ACM.
Schmidt R, Singh K. Sketch-based procedural surface modeling and compositing using Surface Trees. InComputer Graphics Forum, Apr. 2008, (vol. 27, No. 2, pp. 321-330). Oxford, UK: Blackwell Publishing Ltd.
Allaire et al., "A level-set method for shape optimization", Analyse numérique/Numerical Analysis, Comptes Rendus Mathematique, Ser. I vol. 334 No. 12, 2002, pp. 1125-1130.
Andre et al., "Single-View Sketch Based Modeling". In Proceedings of the Eighth EUROGRAPHICS Symposium on Sketch-Based Interfaces and Modeling, ACM, 2011, pp. 133-140.
Arora et al., "SketchSoup: Exploratory Ideation using Design Sketches", 2016, 11 pages.
Attar et al., "Physics-Based Generative Design", CAAD Futures Conference 2009, pp. 231-244.
Bae et al., "ILoveSketch: As-Natural-As-Possible Sketching System for Creating 3D Curve Models", In Proceedings of the 21st annual ACM symposium on User interface software and technology, Oct. 19-22, 2008, pp. 151-160.
Bae et al., "EverybodyLovesSketch:3D Sketching for a Broader Audience" In Proceedings of the 22nd annual ACM symposium on User interface software and technology, Oct. 4-7, 2009, pp. 59-68.
Bendsøe, M. P. "Optimal shape design as a material distribution problem", Structural optimization, 1(4), 1989, pp. 193-202.
Dillon, M. R., "Dynamic Design: Cognitive Processes in Design Sketching". Indiana Undergraduate Journal of Cognitive Science, 5, 2010, pp. 28-43.
Do, E. Y. L., "Design sketches and sketch design tools", Knowledge-Based Systems, 18(8), 2005, pp. 383-405.
Dorsey et al., "The mental canvas: A tool for conceptual architectural design and analysis". In Computer Graphics and Applications, 15th Pacific Conference on Computer Graphics and Applications, IEEE, 2007 pp. 201-210.
Du et al., "Computational multicopter design", ACM Transactions on Graphics (TOG), vol. 35, No. 6, Article 227, Nov. 2016, 10 pages.
Gross et al., "Ambiguous intentions: a paper-like interface for creative design". In Proceedings of the 9th annual ACM symposium on User interface software and technology, Nov. 1996, pp. 183-192.
Igarashi et al., "A suggestive interface for 3D drawing" In Proceedings of the 14th annual ACM symposium on User interface software and technology, Nov. 2001, pp. 173-181.
Kallio, K., "3D6B editor: projective 3D sketching with line-based rendering", 2nd Eurographics Workshop on Sketch-Based Interfaces and Modeling, 2005, pp. 1-7.
Kazi et al., "Kitty: sketching dynamic and interactive illustrations", In Proceedings of the 27th annual ACM symposium on User interface software and technology, Oct. 5-8, 2014, pp. 395-405.
Kenwright, B. "Inverse kinematics—cyclic coordinate descent (CCD)". Journal of Graphics Tools, vol. 16, No. 4, 2012, pp. 177-217.
Kim et al., "SketchingWithHands: 3D Sketching Handheld Products with First-Person Hand Posture", In Proceedings of the 29th Annual Symposium on User Interface Software and Technology, ACM, Oct. 16-19, 2016, pp. 797-808.
Lee et al., "Shadowdraw: real-time user guidance for freehand drawing" In ACM Transactions on Graphics, vol. 30, No. 4, Article 27, Jul. 2011, 10 pages.
Martínez et al., "Structure and appearance optimization for controllable shape design" ACM Transactions on Graphics (TOG), vol. 34, No. 6, Article 229, Nov. 2015. pp. 229:1-229:11.
Murugappan et al., "Feasy: a sketch-based interface integrating structural analysis in early design", In ASME 2009 International Design Engineering Technical Conferences and Computers and Information in Engineering Conference, American Society of Mechanical Engineers, Aug. 30-Sep. 2, 2009, pp. 743-752.
Nishida et al., "Interactive Sketching of Urban Procedural Models", ACM Transactions on Graphics (TOG), vol. 35, No. 4, Article 130, Jul. 2016, 11 pages.
Olsen et al., "Sketch-based modeling: A survey", Computers & Graphics, vol. 33, No. 1, 2009, pp. 85-103.
Paczkowski et al., "Insitu: sketching architectural designs in context", ACM Transactions on Graphics, vol. 30, No. 6, Article 182, Dec. 2011, pp. 182:1-182:10.
Parish et al., "Procedural modeling of cities", In Proceedings of the 28th annual conference on Computer graphics and interactive techniques, ACM, Aug. 12-17, 2001, pp. 301-308.
Schmidt et al., "On expert performance in 3D curvedrawing tasks" In Proceedings of the 6th EUROGRAPHICS Symposium on Sketch-Based Interfaces and Modeling, ACM, Aug. 1-2, 2009, pp. 133-140.
Shao et al., "CrossShade: Shading Concept Sketches Using Cross-Section Curves", ACM Transactions on Graphics, vol. 31, No. 4, Article 45, Jul. 2012, pp. 45:1-45:11.
Shao et al., "Interpreting Concept Sketches". ACM Transactions on Graphics (TOG),vol. 32, No. 4, Article 56, Jul. 2013, pp. 56:1-56:10.
Suwa et al., "What architects see in their sketches: Implications for design tools", In Conference Companion on Human Factors in Computing Systems, ACM, Apr. 13-18, 1996, pp. 191-192.
Ulu et al., "Generative interface structure design for supporting existing objects", Journal of Visual Languages and Computing vol. 31, 2015, pp. 171-183.
Umetani et al., "Guided exploration of physically valid shapes for furniture design". ACM Transactions on Graphics, vol. 31, No. 4, Article 86, Jul. 2012, pp. 86:1-86:11.
Wang et al., "A level set method for structural topology optimization", Computer methods in applied mechanics and engineering, 192, 2003, 227-246.

(56) References Cited

OTHER PUBLICATIONS

Wang et al.,"3D reconstruction of curved objects from single 2D line drawings", IEEE Conference on Computer Vision and Pattern Recognition, pp. 1834-1841.
Xu et al., "True2Form: 3D Curve Networks from 2D Sketches via Selective Regularization", ACM Transactions on Graphics, vol. 33, No. 4, Jul. 2014, 13 pages.
Zaman et al., "Gem-Ni: A system for creating and managing alternatives in generative design", In Proceedings of the 33rd Annual ACM Conference on Human Factors in Computing Systems, Apr. 18-23, 2015, pp. 1201-1210.
Zheng et al., "Ergonomics-inspired reshaping and exploration of collections of models", IEEE Transactions on Visualization and Computer Graphics, vol. 22, No. 6, 2015, pp. 1732-1744. Pre-publication manuscript version retrieved Jun. 9, 2020 from https://repository.kaust.edu.sa/bitstream/handle/10754/584263/07130656.pdf?sequence=1&isAllowed=y.
Non-Final Office Action received for U.S. Appl. No. 15/784,051 dated Dec. 27, 2019, 16 pages.
Tschuchnigg et al., "Comparison of deep foundation systems using 3D finite element analysis employing different modeling techniques", in Geotechnical Engineering Journal of the SEAGS & AGSSEA vol. 44 No. 3 Sep. 2013, 7 pages.
Ramaji et al., "Identification of structural issues in design and construction of mulit-story modular buildings", 1st Residential Building Design & Construction Conference, Feb. 2013, 11 pages.

* cited by examiner

THREE-DIMENSIONAL GENERATIVE DESIGN BASED ON TWO-DIMENSIONAL SKETCHING

CROSS-REFERENCE TO RELATED APPLICATIONS

This application is a continuation of U.S. patent application titled, "THREE-DIMENSIONAL GENERATIVE DESIGN BASED ON TWO-DIMENSIONAL SKETCHING," filed on Oct. 13, 2017 and having Ser. No. 15/784,051, which claims priority benefit of the U.S. Provisional patent application titled, "THREE-DIMENSIONAL GENERATIVE DESIGN BASED ON TWO-DIMENSIONAL SKETCHING," filed on Sep. 25, 2017 and having Ser. No. 62/563,044. The subject matter of these related applications is hereby incorporated herein by reference.

BACKGROUND OF THE INVENTION

Field of the Invention

Embodiments of the present invention relate generally to computer aided design and, more specifically, to three-dimensional generative design based on two-dimensional sketching.

Description of the Related Art

Designers typically draw or otherwise illustrate various elements of a conceptual design. For example, an industrial designer could draw two sections of an appliance within an illustration of a kitchen. Often, designers may exclude various details from a conceptual design to emphasize important design features, thus facilitating a more flexible design process. For example, a designer may not illustrate a structural connection between two parts of an appliance. Excluding the structural connection may simplify the conceptual design, assist in emphasizing the individual design features, and allow for more flexibility in the design process.

Typically, after a designer creates a conceptual design, a second party converts the conceptual design into a buildable engineering model. The second party could be an engineer and/or an individual experienced in designing three-dimensional computer aided design (CAD) models for engineering applications. The second party typically converts the two-dimensional conceptual design into a three-dimensional CAD model. The second party may add structural elements throughout the CAD model and evaluate the resulting structure for stability, flexibility, strength, load, and other engineering design constraints. Given the rough nature of conceptual designs, several CAD models can satisfy the engineering design constraints of a conceptual design.

One drawback of prior art techniques is that the CAD model created by the second party may differ from the design envisioned by the designer. Thus, many hours of design work may be wasted.

As the foregoing illustrates, what is needed in the art is a more effective approach for constructing conceptual designs.

SUMMARY OF THE INVENTION

Various embodiments of the present invention provide a computer-implemented method for generating a three-dimensional model from a two-dimensional sketch. The computer-implemented method includes receiving input indicating a set of points defining a first sketch element and a second set of points defining a second sketch element included in a sketch. The computer-implemented method further includes identifying one or more design relationships between the first sketch element and the second sketch element. The computer-implemented method further includes generating a computer model of the sketch that represents a structure linking the first sketch element and the second sketch element according to the one or more design relationships. The computer-implemented method further includes outputting the first sketch element, the second sketch element, and the structure for display.

At least one advantage of the disclosed approach is that the sketch application converts vague conceptual designs into structurally sound engineering models. Accordingly, a designer can fully engage in design ideation without focusing on generating a structurally sound engineering model. Further, a designer can iteratively modify a given engineering model to discover a design that is aesthetically pleasing and structurally sound.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
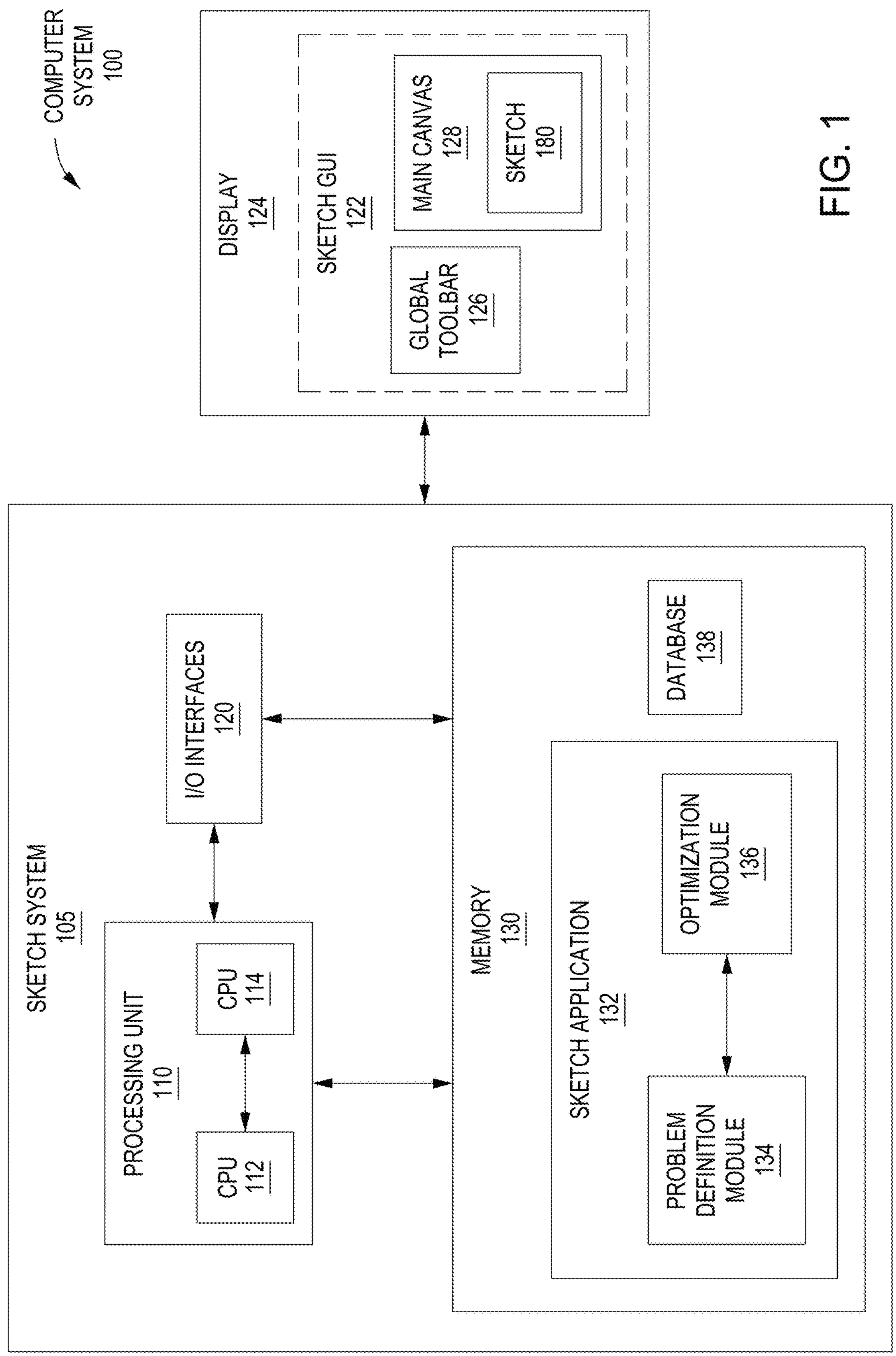
FIG. 1 is a block diagram of a computer system configured to implement one or more aspects of the present invention.

FIG. 1 is a block diagram of a computer system configured to implement one or more aspects of the present invention. As shown, the computer system 100 includes, without limitation, a sketch system 105 and a display 124. Sketch system 105 includes a processing unit 110, input/output (I/O) interfaces 120, and memory 130.

The processing unit 110 may include a central processing unit (CPU) and/or a graphics processing unit (GPU). In operation, the processing unit 110 is the master processor of the computer system 100, controlling and coordinating operations of other system components. In addition, the processing unit 110 incorporates circuitry optimized for graphics processing, including, for example, graphics output circuitry. Processing unit 110 delivers pixels to the display 124 via I/O interfaces 120. Display 124 may be any conventional cathode ray tube, liquid crystal display, light-emitting diode display, or the like.

In various embodiments, processing unit 110 may be integrated with one or more of other elements of FIG. 1 to form a single system. In alternate embodiments, processing 110 may be any instruction execution system, apparatus, or device capable of executing instructions. For example, a processor could comprise a digital signal processor (DSP), a controller, a microcontroller, a state machine, or any combination thereof.

Input/output (I/O) interfaces 120 may include one or more interfaces that coordinate the transfer of pixels, inputs, and commands between sketch system 105 and display 124. For example, I/O interfaces 120 may receive inputs from display 124 and transmit those inputs to processing unit 110. In addition, I/O interfaces 120 may receive pixels from I/O interfaces 120 and transmit those pixels to display 124.

The memory 130 stores content, such as software applications and data, for execution and use by processing unit 110. The memory 130 may be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the memory 130. The storage may include any number and type of external memories that are accessible to processing unit 110. For example, and without limitation, the storage may include a Secure Digital Card, an external Flash memory, a portable compact disc read-only memory (CD-ROM), an optical storage device, a magnetic storage device, or any suitable combination of the foregoing.

It will be appreciated that the computer system 100 shown herein is illustrative and that variations and modifications are possible. The number of processing units 110, the number of I/O interfaces 120, the number of memories 130, and the number of applications included in the memory 130 may be modified as desired. Further, the connection topology between the various units in FIG. 1 may be modified as desired. In some embodiments, any combination of processing unit 110, I/O interfaces 120, and memories 130 may be replaced with any type of distributed computer system or cloud computing environment, such as a public or a hybrid cloud.

Sketch Elements and Design Relationships for Specifying Problem Definition

To enable designers to efficiently convert an ambiguous conceptual design into a structurally sound engineering model, the memory 130 includes, without limitation, a sketch application 132 and a database 138. The sketch application 132 provides various design tool interfaces for creating a sketch 180 that encapsulates a design concept. Sketch 180 includes a representation of various three-dimensional objects and, optionally, defines relationships between those objects. As shown, the sketch application 132 includes a problem definition module 134 and an optimization module 136.

Problem definition module 134 comprises a software program that generally resides within the memory 130 and is executed by the processing unit 110. Problem definition module 134 performs at least three functions: (1) generate the sketch graphical user interface (GUI) 122, (2) process inputs received at the sketch GUI 122 to create and update sketch 180, and (3) generate problem definitions based on sketch 180 that encapsulates the engineering design constraints of a conceptual design. Problem definition module 136 further transmits the problem definition to optimization module 136.

Optimization module 136 comprises a software program that generally resides within the memory 130 and is also executed by the processing unit 110. Optimization module 136 receives the problem definition from problem definition module 134 and generates a set of solutions to the problem definition. Each solution includes a computer model of buildable support structure that satisfies each of the engineering design constraints specified in the problem definition. Optimization module 136 outputs the set of solutions to problem definition module 134. In various embodiments, problem definition module 134 selects a solution for display from the set of solutions and outputs the selected solution to display 124 via I/O interfaces 120.

The Sketch GUI

Sketch GUI 122 is an interface generated by problem definition module 134 that facilitates a designer in visualizing a conceptual design. In various embodiments, sketch GUI 122 includes, without limitation, a global toolbar 126 and a main canvas 128. Main canvas 128 is the main drawing area of sketch GUI 122. Main canvas 128 is the main drawing area where a designer creates and modifies sketch 180 that encapsulates a conceptual design.

Sketch 180 includes one or more sketch elements. A sketch element is a two-dimensional graphics object that functions as the basic building block of sketch 180. A sketch element may include a set of points on main canvas 128. Each point within the sketch element may share a common characteristic, such as a color. The set of points included in the sketch element may also have various other characteristics, including, but not limited to, a size, a shape, and so forth. In addition, various characteristics of sketch 180 may be displayed on main canvas 128. For example, main canvas 128 may include a numerical display that indicates a dimension of a conceptual design, a volume of the conceptual design, a weight of the conceptual design, and so forth.

Global toolbar 126 includes sets of tools that each provides a particular functionality to the designer for creating and modifying different aspects of the sketch. Depending on the particular feature a designer is attempting to sketch, a designer may select a different tool from the global toolbar 126. In particular, global toolbar 126 may include a sketching tool, a color tool, a texture tool, design relationship tools, and extrusion tool, a file upload tool, a void tool, an applied load tool, a patch tool, and so forth. Each tool in global toolbar 126 facilitates a designer in modifying one or more aspect of sketch 180 on main canvas 128. In particular, the designer may apply a sketching tool to a set of points in main canvas 128 via an input tool. Applying the tool to the set of points on main canvas 128 associates a corresponding characteristic with the set of points. For example, applying a color tool to a set of points associates a color with the set of points. In addition, applying a texture tool associates a particular texture with a sketch element.

In various embodiments, a designer may use a stylus and/or a mouse to provide input to sketch GUI 122. For example, a designer could draw an outline of a sketch element on main canvas 128.

In some embodiments, global toolbar 126 may include an extrusion tool that enables a designer to extrude a sketch element on main canvas 128 along an extrusion dimension. The designer may specify the extrusion dimension and an extrusion length in any technically feasible manner. For example, and without limitation, after selection of the extrusion tool, global tool 126 may display a pop-up with text input fields. The designer could enter the extrusion dimension and the extrusion length into the text input fields. Additionally or alternatively, a designer could specify the extrusion dimension and the extrusion length by drawing on main canvas 128.

In various embodiments, global toolbar 126 may include a patch tool that enables a designer to group a set of points on main canvas 128 as a single sketch element. In various embodiments, a visual patch may be displayed on main canvas 128. The designer may modify the position, size, shape, etc. of the patch in order to designate a set of points of main canvas 128 as a sketch element.

In addition, in some embodiments, global toolbar 126 may include a file upload tool that enables a designer to upload a file to main canvas 128 that includes one or more sketch elements. The sketch element may be displayed on main canvas 128.

In various embodiments, a global toolbar 126 may include a design relationship tools. The design relationship tools may include a constraint tool and an applied load tool. The constraint tool enables a designer to define a relationship between two or more sketch elements. In particular, a designer may relate one or more of a scale, a position, a rotation, and a state of assembly of two or more sketch elements via the constraint tool.

Various objects in a conceptual design may be load-bearing. The applied load tool enables a designer to define a load on a sketch element that corresponds to a load-bearing object in the conceptual design. Further, in a conceptual design, an anchor object provides structural support to load-bearing objects. Global toolbar 126 may include an anchor tool that enables a designer designate a sketch element as an anchor sketch element.

In addition, global toolbar 126 includes a void tool that enables a designer to designate a void on main canvas 128. A void is a set of points of main canvas 128 that includes no sketch elements or buildable support structures. The designer may designate voids in sections of sketch 180 that correspond to areas of a conceptual design that the designer intends to leave vacant or empty.

Further, global toolbar 126 may include a design aid tool. A designer may select the design aid tool to display a design aid on main canvas 128. For example, a design aid may include a manikin. In various embodiments, a design aid may provide a visual guide to a designer and assist the designer in determining appropriate distance separations between objects in a conceptual design.

In operation, sketch GUI 122 receives input via main canvas 128 and transmits the input to problem definition module 134. In various embodiments, sketch GUI 122 receives input that indicates a selected tool and/or a set of selected points on main canvas 128. Sketch GUI 122 associates a characteristic of the selected tool with the selected set of points. For example, if the selected tool is a color tool, sketch GUI 122 associates a selected color with each point in the set of selected points. Sketch GUI 122 redraws the modified sketch on main canvas 128 with the set of selected points having the selected characteristic. Additionally or alternatively sketch GUI 122 may function as a pass through for user input and problem definition module 134 may generate a modified sketch 180 responsive to user input. Problem definition module 134 may output the modified sketch 180 to sketch GUI 122 for display.

The Problem Definition

In various embodiments, sketch GUI 122 transmits sketch 180 to problem definition module 134. Problem definition module 134 analyzes sketch 180 and parses sketch 180 into sketch elements and design relationships.

With respect to sketch elements, problem definition module 134 determines various characteristics of each sketch element that may include, but is not limited to, the size, shape, number of points, extrusion dimension, extrusion length, color, and texture of each sketch element. Problem definition module 134 stores the characteristics of each sketch element in database 138.

With respect to the design relationships, problem definition module 134 identifies each design relationship designated between sketch elements. These design relationships may include, but are not limited to, constraints, applied loads, and anchor sketch elements. In addition, problem definition module 134 identifies set of points designated as voids. Problem definition module 138 includes the design relationships into a problem definition. In various embodiments, the problem definition encapsulates constraints that specify the relative positions of sketch elements which respect to each other. In addition, the problem definition identifies load-bearing sketch elements and anchor sketch elements that support load-bearing sketch elements. The problem definition further includes voids—designer-specified sets of points in sketch 180 that should remain free of sketch elements and support structures.

Generating Solutions

To generate and display a solution to the problem definition, problem definition module 134 transmits the problem definition to optimization module 136. Optimization module 136 receives the problem definition from the problem definition module 134 and constructs one or more solutions to the problem definition. Optimization module 136 outputs the solutions to the problem definition module 134 for display.

In various embodiments, a solution includes designer-generated sketch elements and buildable support structures that connect load-bearing sketch elements with one or more anchor sketch elements. In some embodiments, optimization module 136 optimizes solutions to minimize the total volume of the solution and/or to minimize the flexibility of the support structure to applied loads.

In various embodiments, optimization module 136 may access database 138 to determine the characteristics of each sketch element in sketch 180. In various embodiments, in addition to storing characteristics of each sketch element, database 138 may also store algorithms and/or optimization routines for generating optimized solutions to the problem definition. For example, database 138 may include topology optimization routines, such as level-set shape optimization algorithms.

In some embodiments, optimization module 136 accesses database 138 to perform one or more algorithms and/or optimization routines on the problem definition to generate a solution. For example, optimization module 136 could access database 138 to implement a topology optimization routine on the problem definition.

Displaying Solutions

In various embodiments, optimization module 136 outputs a set of solutions to problem definition module 134 for display. Problem definition module 134 selects a solution from the set of solutions and outputs the selected solution to sketch GUI 122 for display via I/O interfaces 120.

In various embodiments, a designer views the displayed solution on display 124. A designer may select a different solution for display by modifying various characteristics of sketch elements displayed on main canvas 128. For example, a designer may implement the sketching tool to adjust the position of sketch element. Responsive to user-input, problem definition module 134 searches through the set of solutions and selects a solution in which the position of the selected sketch element most closely matches the designer-modified position of the selected sketch element. Problem definition module 134 outputs the selected sketch element to sketch GUI 122 for display.

In addition, a designer may add and/or remove sketch element from sketch 180 and/or add and/or remove design relationships from sketch 180. Accordingly, problem definition module 134 generates a modified problem definition and transmits the modified problem definition to optimization module 136. Optimization module 136 generates a second set of solutions based on the modified problem definition and outputs the second set of solutions to problem definition module 134. As described above, problem definition module 134 selects a solution from the second set of solutions and outputs the selected solution to sketch GUI 122 for display.

Note that the techniques described herein are illustrative rather than restrictive, and may be altered without departing from the broader spirit and scope of the invention. Many modifications and variations on the functionality provided by any or all of processing unit 110, the sketch application 120, the problem definition module 134, the optimization engine 136, the database 138, the I/O interfaces 120, the sketch GUI 122, the global toolbar 126, the main canvas 128, and the sketch 180 will be apparent to those of ordinary skill in the art without departing from the scope and spirit of the described embodiments.

In various embodiments, any number of the techniques described above may be implemented while other techniques may be omitted in any technically feasible fashion for creating problem definitions responsive to designer-input and generating and displaying solutions to problem definitions.

In alternate embodiments, the memory 130 may not include the sketch application 120. Further, the sketch application 120 may not include the problem definition module 134 and/or optimization module 136. In some embodiments, any number of the sketch application 132, the problem definition module 134, and the optimization module 136 may be stored on computer readable media such as a CD-ROM, DVD-ROM, flash memory module, or other tangible storage media. Further, in some embodiments, the problem definition module 134 and/or the optimization module 136 may be provided as an application program (or programs) stored on computer readable media such as a CD-ROM, DVD-ROM, flash memory module, or other tangible storage media. In various embodiments, the functionality of the problem definition module 134 and the optimization module 136 are integrated into or distributed across any number (including one) of software applications.

The components illustrated in the sketch system 105 may be included in any type of computer system, e.g., desktop computers, server computers, laptop computers, tablet computers, distributed network, cloud computing environment, and the like. Additionally, the display 124 and/or the sketch application 132 may execute on distributed systems communicating over computer networks including local area networks or large, wide area networks, such as the Internet. The display 124 and the sketch system 105 described herein are not limited to any particular computing system and may be adapted to take advantage of new computing systems as they become available. In alternate embodiments, the functionality of the sketch application 132, the problem definition module 134, and the processing unit 110 may be implemented and provided in any technically feasible manner. For instance, in some embodiments the functionality of the sketch application 132, the problem definition module 134, and/or the processing unit 110 may be provided as a cloud-based service.

FIGS. 2A-2E illustrate a sequence of sketches in sketch GUI 122 that includes a conceptual design and a computer model based on the conceptual design, according to various embodiments. As shown, main canvas 210 includes sketch elements 220 and applied load 230.

Figure 2A:
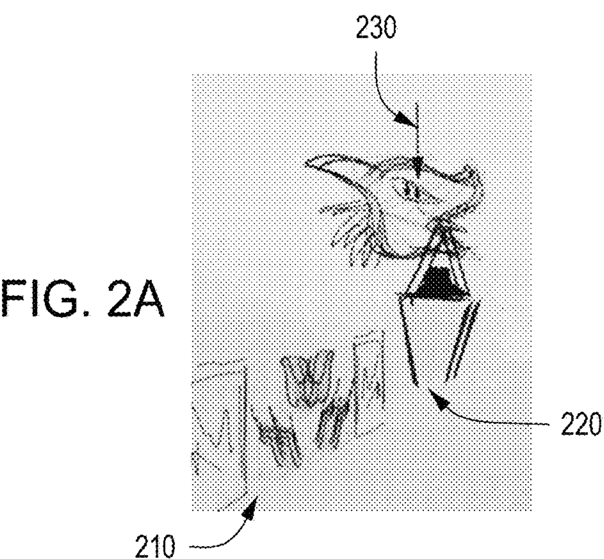
FIGS. 2A-2E illustrate a sequence of sketches in a sketch GUI that includes a conceptual design and a computer model based on the conceptual design, according to various embodiments.

In FIG. 2A, responsive to designer input, sketch GUI 122 generates sketch elements on main canvas 210, including sketch element 220. In various embodiments, sketch GUI 122 may receive input that indicates a color to associate with the set of points. As shown in FIG. 2A, a fill color is associated with the set of points in sketch element 220. A designer may select a color tool in global toolbar 126 and may designate a set of points in main canvas 128 to associate with a particular color. Sketch GUI 122 receives input that indicates the fill color and the designated set of points via main canvas 128.

In some embodiments, sketch GUI 122 transmits the fill color the designated set of points to problem definition module 134. Problem definition module 134 stores the set points and the fill color in database 138, modifies sketch 180 by updating the fill color of each point in the designated set of points, and outputs the modified sketch 180 to sketch 122 via I/O interfaces 120. Sketch GUI 122 displays the updated sketch 180 on main canvas 210.

Further, a designer may implement the patch tool to associate a set of points as a single sketch as described in FIG. 1. In particular, a designer may implement the patch tool to designate the set of points in sketch element 220 as a single sketch element.

Furthermore, FIG. 2A illustrates applied load 230. As described above, a designer may implement an applied load tool to specify a sketch element as load-bearing. In particular, in FIG. 2A, sketch element 230 is designated as being load-bearing. In various embodiments, by default, all sketch elements that are not load-bearing are anchor sketch element. In other embodiments, the designer specifies one or more sketch elements as anchor sketch elements.

In various embodiments, sketch GUI 122 may display a visual indicator proximate to load-bearing sketch elements (e.g., a red arrow). The length of the arrow may be proportional to one or more parameters of the applied load (e.g., the magnitude of the applied load). In various embodiments, global toolbar 126 includes a text input field. Sketch GUI 122 may receive numerical input that indicates a magnitude of an applied load via the text input field on global toolbar 126. Sketch GUI 122 may transmit the magnitude of the applied load to problem definition module 134 with sketch 180. Problem definition module 134 may further include the magnitude of the applied load in the problem definition.

In addition, sketch GUI 122 may receive an extrusion dimension for each sketch element displayed on main canvas 210. In various embodiments, global toolbar 126 includes an extrusion tool. Sketch GUI 122 may receive input indicating a selection of the extrusion tool and a sketch element to extrude. In addition, sketch GUI 122 may receive an extrusion dimension and an extrusion length. In some embodiments, a designer may illustrate the extrusion dimension on main canvas 210. In other embodiment, sketch GUI 122 may receive the extrusion dimension from the designer via textual input into a text input field on global toolbar 126. Similarly, sketch GUI 122 may receive an extrusion length via a text input field on global toolbar 126. Sketch GUI 122 may transmit the extrusion dimension and the extrusion length to problem definition module 134 with sketch 180. Problem definition module 134 may store the extrusion dimension and the extrusion length associated with sketch element 220 in database 138.

Problem definition module 134 may further select a set of points in sketch element 220 that corresponds to a longest line in sketch element 220. Problem definition module 134 may extrude sketch element 220 along the extrusion dimension. Problem definition module 134 may set the magnitude of the extrusion dimension to be similar to the input-specified magnitude of the extrusion dimension. Extruding the longest line may generate additional extrusion faces in sketch element 220. Problem definition module 134 may replicate other sets of points on the generated extrusion faces of sketch element 220. Problem definition may further output the extruded sketch element 220 to sketch GUI 122 for display in main canvas 210.

Figure 2B:
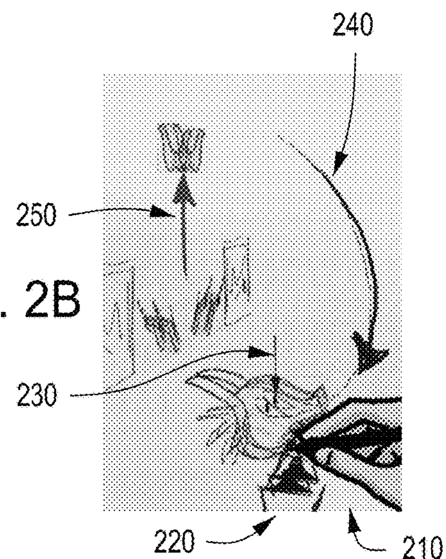

In FIG. 2B, sketch GUI 122 receives input that indicates a design relationship between two sketch elements. As shown, main canvas 210 includes sketch element 220, applied load 230, and design relationships 240 and 250.

As stated above, a designer may define a design relationship between two or more sketch elements. In particular, FIG. 2B illustrates a constraint. In one or more embodiments, sketch GUI 122 receives input that indicates the selection of a constraint tool. Sketch GUI 122 further receives input that indicates a primary sketch element and one or more dependent sketch elements. In some embodiments, the designer may select a set of points associated with the movement path of the primary sketch element. Responsive to the input, sketch GUI 122 may receive the set of points via main canvas 128 and transmit the set of points to problem definition module 134. Problem definition module 134 may store the set of points in database 138. Problem definition module 134 may modify sketch 180 by associating a fill color with the set of points associated with the movement path of the primary sketch element 240 and or a shape associated with the set of points. As shown in FIG. 2B, problem definition module 134 associates an arrow with the movement path of the primary sketch element 240. Problem definition module 134 may output the modified sketch 180 to sketch GUI 122 for display.

In addition, a designer may designate one or more sketch elements as dependent sketch elements. For example, in FIG. 2B, sketch element 220 is a dependent sketch element. The designer may also indicate a movement path for the dependent sketch element(s). In various embodiments, Sketch GUI 122 receives input that indicates that one or more sketch elements are dependent sketch elements. Sketch GUI 122 may also receive a set of points associated with a movement path of the dependent sketch element(s). Sketch GUI 122 transmits inputs to problem definition module 134 that indicates the dependent sketch element(s) 250 and a set of points that constitutes the movement path of the dependent sketch element(s) 250. Problem definition module 134 may store the set of points associated with the movement path of the dependent sketch elements 250 in database 138. Problem definition module 134 may further modify sketch 180 by associating a fill color with the set of points associated with the movement path of the dependent sketch element(s) 250. As shown in FIG. 2B, problem definition module 134 associates an arrow with the movement path of the dependent sketch element 250. Problem definition module 134 further outputs the modified sketch 180 to sketch GUI 122 for display.

In various embodiments, the arrows associated with primary sketch element 240 and dependent sketch element(s) 250 illustrate the directionality of the constraint relationship between the primary sketch element and the dependent sketch element(s) respectively. For example, in FIG. 2B, the primary sketch element moves upwards as the dependent sketch element moves downwards and vice versa.

Although the above discussion was directed toward a constraint that defines a translational relationship between two or more sketch elements, a designer can specify a constraint that relates one or more of a scale, a position, a rotation, and a state of assemble of two or more sketch elements. Responsive to input, problem definition module 134 generates the specify type of constraint between the selected sketch elements.

Figure 2C:
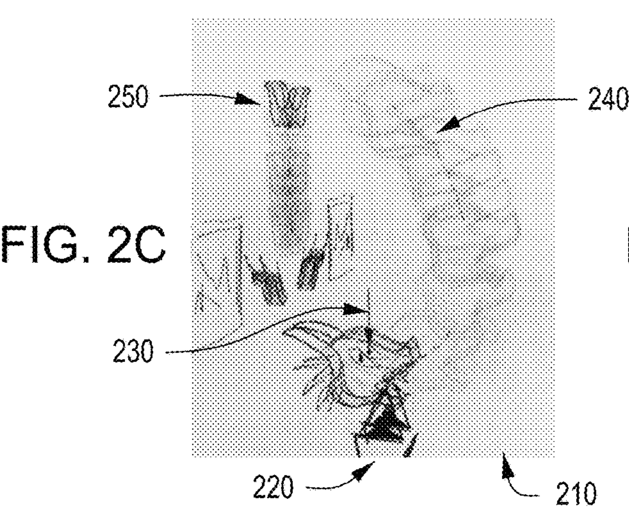

FIG. 2C illustrates a range of motion of primary sketch element 240 and dependent sketch element 250. In various embodiments, a designer may provide input into main canvas 128 that indicates that a position of one of primary sketch element 240 and dependent sketch element 250 should be adjusted. Responsive to user input, primary sketch element 240 may modify sketch 180 by varying the position of primary sketch element 240 and dependent sketch element 250 according to the user-defined design relationship stored in database 138. Primary definition module 134 may further output the modified sketch 180 to sketch GUI 122 for display on main canvas 128.

In addition, problem definition module 134 generates a problem definition that includes the user-defined design relationships, including, but not limited to, constraints and applied loads. Problem definition module 134 transmits the problem definition to optimization module 136.

In various embodiments, optimization module 136 receives the problem definition from problem definition module 134. Additionally or alternatively, problem definition module may access database 138 to obtain the user-defined design relationships and to obtain the dimensions of the sketch elements in sketch 180. Optimization module 136 further accesses database 138 to obtain one or more algorithms and/or optimization routines for generating optimized solutions to the problem definition.

In operation, optimization module 136 accesses database 138 to select an optimization routine (e.g., a topology optimization routine such as level-set shape optimization). Optimization module 136 further applies the selected optimization routine to the problem definition to generate a solution. In various embodiments, a solution corresponds to an arrangement of sketch elements in sketch 180 that satisfies the user-defined design relationships. In addition, optimization module 136 may add a support structure to sketch 180 to satisfy the load conditions in the problem definition. In some embodiments, optimization module 136 may further generate solutions by minimizing the compliance of a solution. For example, optimization module 136 may maximize the stiffness of a support structure and anchor sketch element to an applied load exerted on a load-bearing sketch element. Additionally or alternatively, optimization module 136 may minimize the volume of sketch 180.

In various embodiments optimization module 136 may discretize the domain of each primary sketch element associated with a constraint into a fixed number of segments. For example, optimization module may divide the movement path of primary sketch element 240 into a number of segments (e.g., an integer number between 1 and 10). Optimization module 136 may construct modified problem statement in which each the movement path of each primary sketch element is limited to a particular segment. Optimization module 136 may further construct solutions for each modified problem statement.

Optimization module 136 further generates a set of solutions to the problem definition as whole and outputs that set of solutions to problem definition module 134. In various embodiments, problem definition module 134 receives a set of solutions from optimization module 136. Problem definition module 134 selects a solution in the set of solutions and outputs that solution to sketch GIU 122 for display.

Figure 2D:
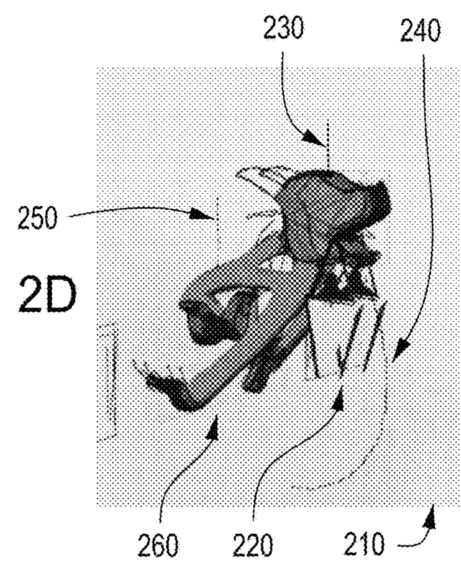

FIG. 2D illustrates a solution generated by optimization module 136 to a problem definition. As shown, sketch GUI 122 includes support structure 260 displayed on main canvas 210. The support structure connects primary sketch element 240 with dependent sketch element 250. The support structure supports the applied load on dependent sketch element 250.

Figure 2E:
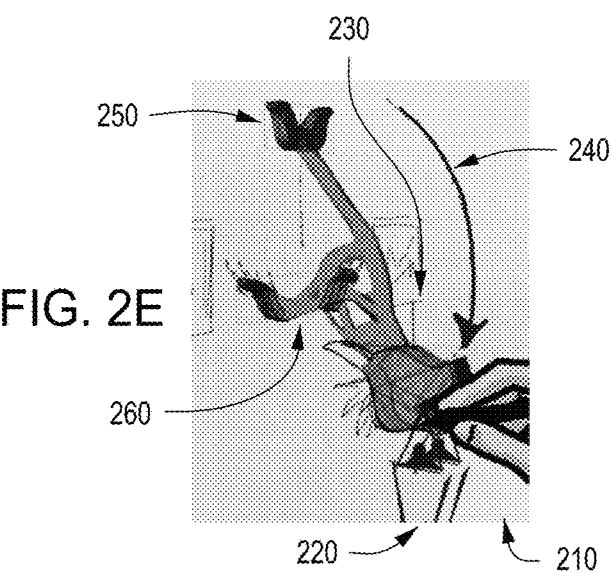

FIG. 2E illustrates a second solution to the problem definition generated by optimization module 136. In various embodiments, a designer can generate input via main canvas 210 that indicates that a position of a sketch element should be modified. Sketch GUI 122 receives the input and transmits to problem definition module 134 the sketch element(s) to be modified, a type of modification to apply to the sketch element, and a magnitude of the modification. For instance, as shown in FIG. 2E, a designer may adjust the position of dependent sketch element 250 along the defined movement path. Sketch GUI 122 receives and transmits the input to problem definition module 134. Problem definition module 134 searches through the set of solutions generated by optimization module 136 and selects a solution that closely matches the modified position of the dependent sketch element 240. Problem solution further outputs the selected solution to sketch GUI 122 for display on main canvas 210.

In various embodiments, a designer may add, remove, and/or modify one or more sketch elements in sketch 180. Additionally or alternatively, a designer may add, remove, and/or modify one or more design relationships between sketch elements in sketch 180. Sketch GUI 122 transmits the input to problem definition module 134. Problem definition module 134 modifies sketch 180 according to the user inputs. In particular, problem definition module 134 may add, remove, and/or modifying one or more sketch elements in sketch 180. Additionally or alternatively, problem definition module 134 may add, remove, and/or modify one or more design relationships between sketch elements in sketch 180. Problem definition module 134 also updates database 138 and modifies the problem definition to reflect the addition, removal, and/or modification of sketch elements and design relationships. Problem definition module 134 further transmits the modified problem definition to optimization module 136.

Optimization module 136 implements algorithms and optimization routines stored in database 138 to generate a second set of solutions in a manner similar to how the optimization module 136 generated the first set of solutions. Optimization module 136 transmits the second set of solution to problem definition module 134. Problem definition module 134 selects a solution in the second set of solutions and outputs the selected solution to sketch GUI 122 for display on main canvas 128.

Accordingly, the sketch application 132 enables a user to iteratively construct a computer model from a vague conceptual design.

FIGS. 3A-3D illustrate a sequence of sketches in sketch GUI 122 that includes a void, according to various embodiments. As shown, main canvas 300 includes void 310, sketch elements 320, loads 330, and constraints 340.

Figure 3A:
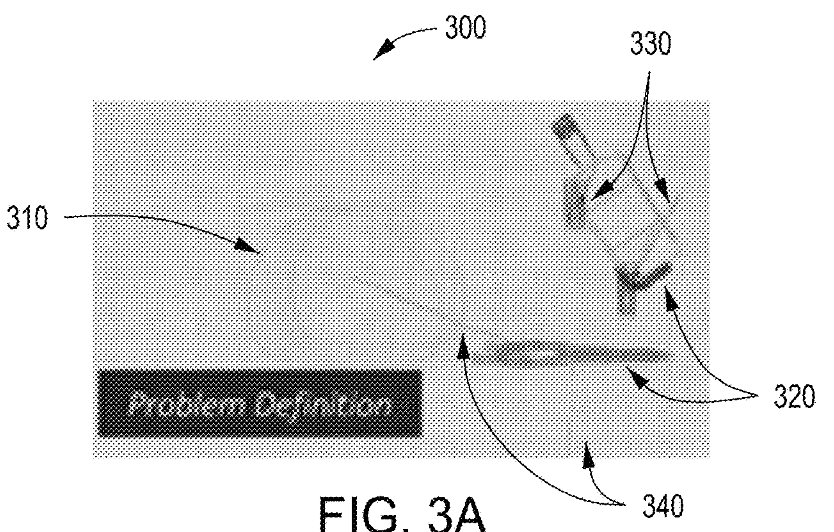
FIGS. 3A-3D illustrate a sequence of sketches in a sketch GUI that includes a void, according to various embodiments.

FIG. 3A illustrates a first configuration of sketch 180. As shown, void 310 is displayed on main canvas 300. In various embodiments, void 310 defines a set of points in sketch 180 that do not include any sketch elements or support structures. In some embodiments, a designer may select a void tool from global toolbar 126. Sketch GUI 122 may receive input that indicates that the void tool has been selected. Sketch GUI 122 may also receive input that indicates that a set of points of sketch 180 should be associated with the void characteristic. Sketch GUI 122 transmits these inputs to problem definition module 134. In various embodiments, problem definition module 134 associates each point in the set of points with the void characteristic. In addition, problem definition module 134 updates the problem definition to indicate that each point in the set of points is associated with the void characteristic.

In addition, as described above, sketch GUI 122 receives inputs that indicates that various sets of points of sketch 180 should be designated as sketch elements 320. In addition, sketch GUI 122 transmits these inputs to problem definition module 134, which updates database 134 and the problem definition. In addition, sketch GUI 122 receives input that indicates that applied loads 330 should be applied on one or more sketch elements. Similarly to the above, sketch GUI 122 transmits these inputs to problem definition module 134. Problem definition module 134 updates database 138 and the problem definition to designate various sketch elements as being load-bearing sketch elements.

In various embodiments, a designer may define an extrusion dimension for void 330 via an extrusion tool in global toolbar 126. Sketch GUI 122 may receive input that indicates an extrusion dimension, and an extrusion length. Sketch GUI 122 transmits the input to problem definition module 134. In some embodiments, problem definition module 134 identifies and extrudes a set of points corresponding to the border of void 330. Problem definition module 134 stores inputs corresponding to the extrusion dimension, extrusion length, and the border of void 330 in database 138.

In addition, a designer may define a design relationship between void 330 and sketch elements 320. As described above, sketch GUI 122 receives input that indicates a set of positions of void 310. In addition, sketch GUI 122 receives input that indicates a set of positions of sketch elements 320. Sketch GUI 122 also receives input that indicates a design relationship between void 330 and sketch elements 320. For example, design relationship 340 could correspond to a translational constraint between void 310 and sketch elements 320. Sketch GUI 122 transmits inputs indicating the set of points corresponding to the allowable positions of void 330, the set of points corresponding to the allowable positions of sketch 320, and the constraint defined between void 330 and sketch elements 320 to problem definition module 134. Problem definition module 134 stores the design relationship and related allowable positions of void 330 and sketch elements 320 in database 138.

Figure 3B:
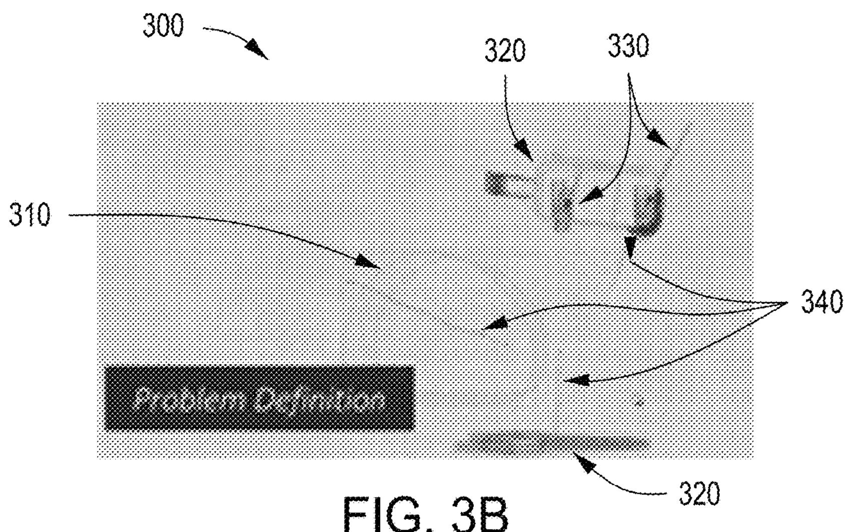

FIG. 3B illustrates a second configuration of sketch 180. Responsive to input, sketch GUI 122 transmits input to problem definition module 134 that modifies sketch 180 according to the design relationships stores in database 138. Problem definition module 134 outputs the modified sketch 180 for display to sketch GUI 122. For example, as shown in FIG. 3B, when void 310 is positioned closer to sketch elements 320, the sketch elements corresponding to the bottle are rotated downwards.

As stated above, problem definition module 134 generates a problem definition based on the design relationships defined via user inputs. Problem definition module 134 transmits the problem definition to optimization module 136. Optimization module 136 generates solutions to the problem definition and transmits a first set of solutions to problem definition module 134.

Figure 3C:
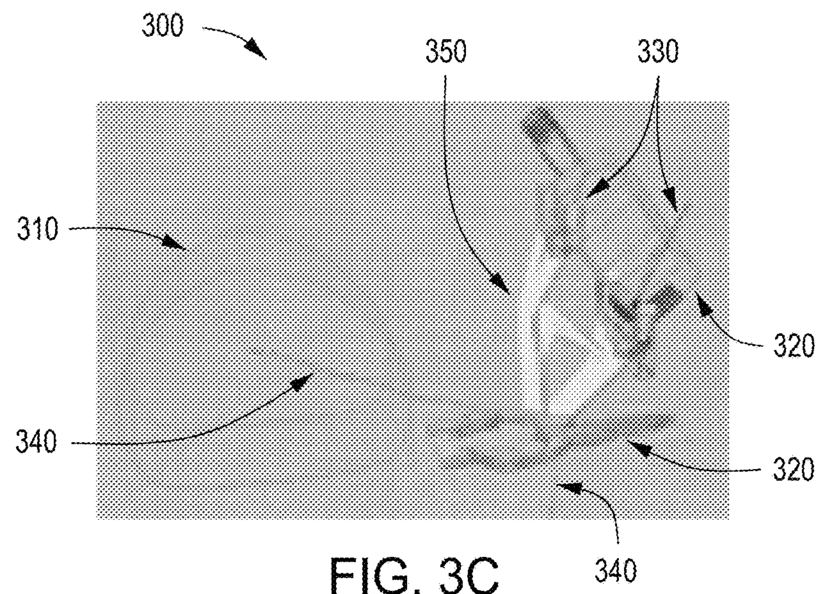
Figure 3D:
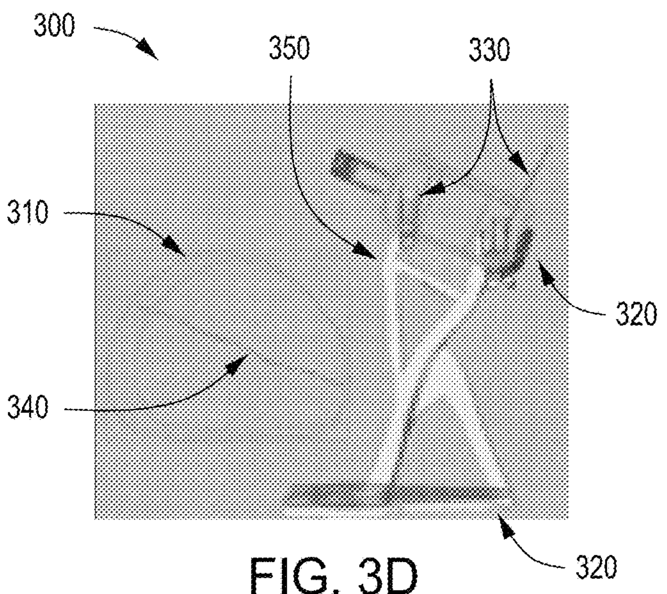

FIGS. 3C-3D illustrate solutions to the problem definition from the set of solutions generated by optimization module 136. In various embodiments, problem definition module 134 selects a solution from the set of solutions and transmits the selected solution to sketch GUI 122 for display. As shown, sketch GUI 122 displays support structure 350 generated by optimization module 136. The support structure 350 is defined to no intersect the set of points in void 310. In particular, in FIG. 3D, the position of void 310 is shifted toward the position of sketch elements 320. Accordingly, support structure 350 deforms to exclude points of sketch 180 that are now included in void 310.

As stated above, responsive to input, problem definition module 134 selects solutions for display that most closely matches the arrangement of sketch elements 320 and void 310 defined by user inputs. In addition, problem definition module 134 may modify the problem definition in response to user input. Optimization module 136 may further generate a second set of solutions to the modified problem solution and output the second set of solutions to problem definition module 134. Problem definition module 134 may select a solution from the second set of solutions and output the selected solution to sketch GUI 122 for display.

Figure 4:
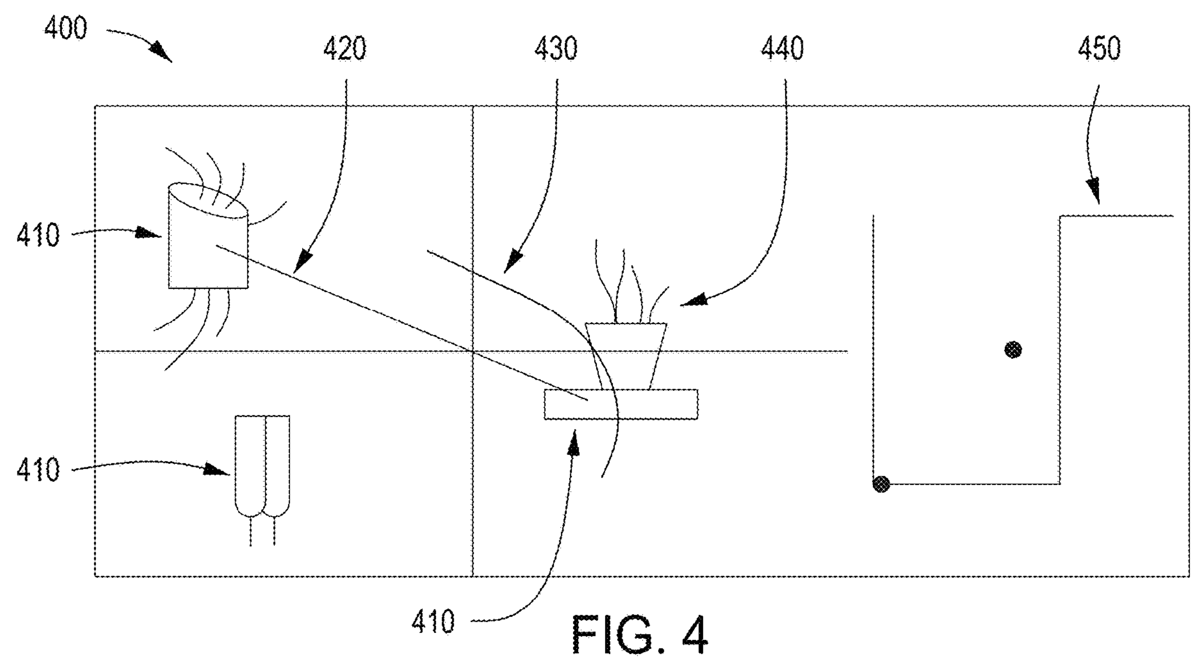
FIG. 4 illustrates a non-linear constraint relationship defined between two sketch elements, according to various embodiments.

FIG. 4 illustrates a non-linear constraint relationship defined between two sketch elements, according to various embodiments. As shown, main canvas 400 includes sketch elements 410, constraint 420, movement path 430, load 440, and functional relationship 450.

In various embodiments, a designer may provide input that indicates that a constraint relationship 420 should be defined between sketch elements 410. In some embodiments, problem definition module 134 may define a default functional relationship 450 between sketch elements 410. For example, problem definition module 134 could, by default, define a linear functional relationship 450 between the translational movements of two sketch elements. Responsive to input, sketch GUI 122 may display a constraint widget on global toolbar 126. The constraint widget may display a functional relationship 450, where a parameter of the primary sketch element is defined on first axis and a parameter of the dependent sketch element(s) are defined by a second axis. The parameters may include a scale, position, rotation, and state of assembly. By default, sketch GUI 122 could display a linear functional relationship 450 on the constraint widget. A designer may modify the functional relationship 450 to display various types of functions, including, non-linear functions, square functions, triangular functions, parabolic functions, and so forth. Responsive to user input, sketch GUI 122 may modify the functional relationship 450 and transmit the modified functional relationship 450 to problem definition module 134. For example, sketch GUI 122 may modify the functional relationship 450 to display a non-linear function. Problem definition module 134 stores the modified functional relationship 450 in database 138. In addition, problem definition module 134 includes the modified functional relationship 450 in a problem definition for transmission to the optimization module 136.

Figure 5:
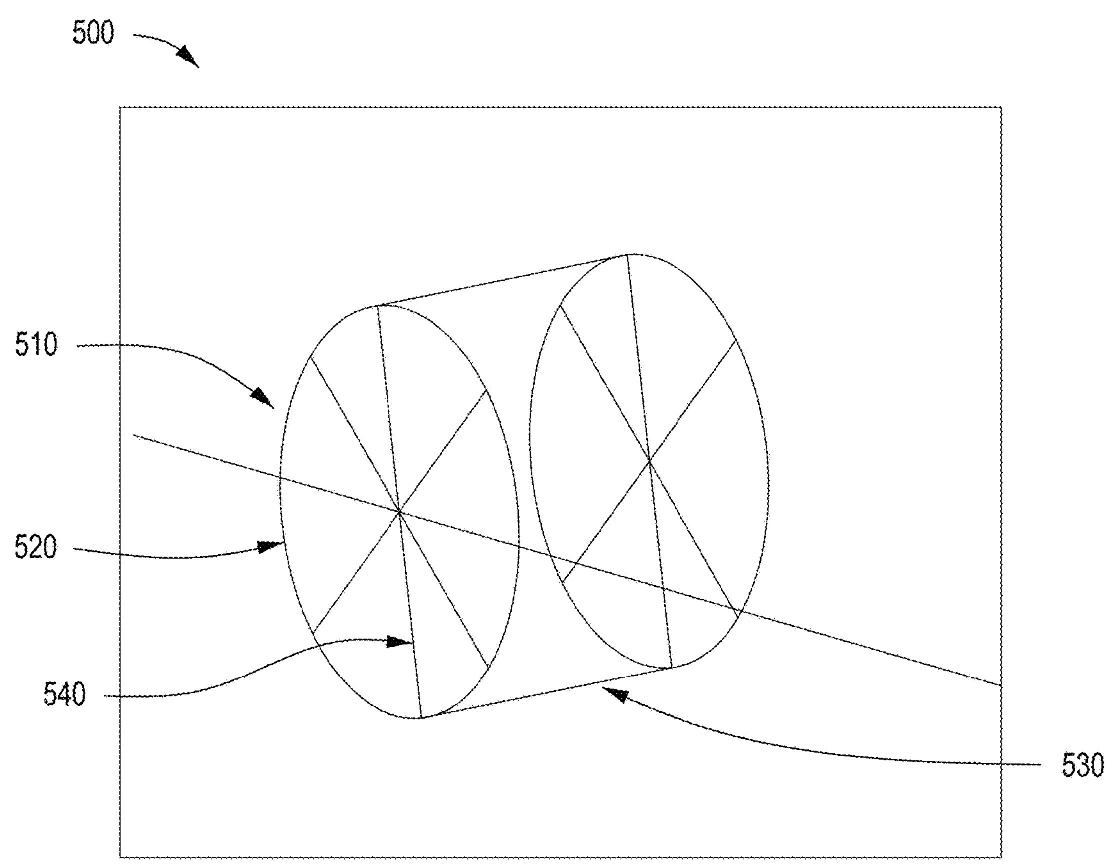
FIG. 5 illustrates an extrusion of a sketch displayed on a main canvas, according to various embodiments.

FIG. 5 illustrates an extrusion of a sketch displayed on a main canvas, according to various embodiments. As shown, main canvas 500 includes sketch element 510, longest line 520, extrusion dimension 530, and illustrative strokes 540.

In some embodiments, a designer may extrude a sketch element 510. In particular, the designer may select an extrusion tool from global toolbar 126. Sketch GUI 122 may receive input that indicates the selection of the extrusion tool. In addition, sketch GUI 122 may receive input that indicates the selection of a sketch element, an extrusion dimension, and an extrusion length. Sketch GUI 122 transmits these inputs to problem definition module 134. In response, problem definition module 134 updates sketch 180. In particular, problem definition module 134 identifies a set of points associated with the longest line in sketch element 510. Problem definition module 134 extrudes the longest line along the extrusion dimension. The extrusion length is defined based on the user input. In addition, problem definition module 134 replicates other set of points in sketch 510 on extrusion faces of sketch element 510. Extrusion faces are new faces of sketch 510 that are generated by the extrusion process. As shown, problem definition module 134 replicates illustrative strokes 540 on the extruded back face of sketch element 510. Problem definition module 134 outputs the extruded sketch element 510 to sketch GUI 122 for display on main canvas 500.

Figure 6A:
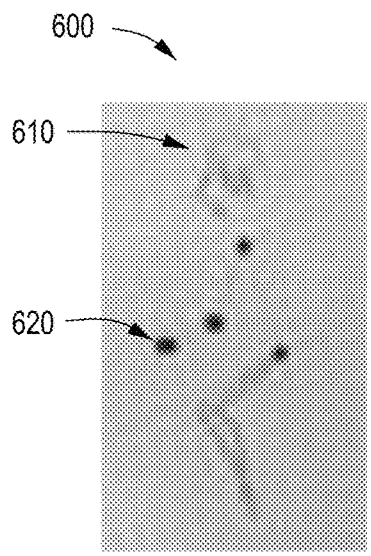
FIGS. 6A-6G illustrate a sequence of sketches that include a design aid, according to various embodiments.

FIGS. 6A-6G illustrate a sequence of sketches that include a design aid, according to various embodiments. In particular, FIG. 6A illustrates a manikin 610 on main canvas 600. Sketch GUI 122 may include a design aid widget in global toolbar 126. A designer may generate input that indicates a selection of the design aid widget on global toolbar 126. Responsive to the input, sketch GUI 122 may display manikin 610 on main canvas 600. Manikin 610 includes one or more configurable parameters, such as a height parameter. Responsive to input, sketch GUI 122 modifies the height of manikin 610 on main canvas 600. For example, sketch GUI 122 may vary the height of manikin 610 between 0.0 and 1.0, responsive to user input. In addition, the position of manikin 610 on main canvas 600 may be user-configurable. In some embodiments, problem definition module 134 automatically assigns a position to the hands of manikin 610 and a position to the waist of manikin 610 for each value of the height of manikin 610. Accordingly, manikin 610 provides an indication of a spatial displacement between various parts of a body. Such spatial distance may provide guidance to a designer to generating conceptual designs for a human user.

Further, attachment area 620 is located on various parts of manikin 610. For example, attachment area 620 may be located at the position of a hand of manikin 610. If problem definition module 134 determines that a sketch element is within a particular radius of an attachment area 620, then problem definition module 134 may associate that sketch element with attachment area 620 in database 138. Accordingly, if problem definition module 134 adjusts a position of manikin 610 responsive to user input, then problem definition module 134 also adjusts the positions of each sketch element associated with the position of manikin 610. In this particular manner, the relative positions of sketch elements associated with manikin 610 may be fixed.

Figure 6B:
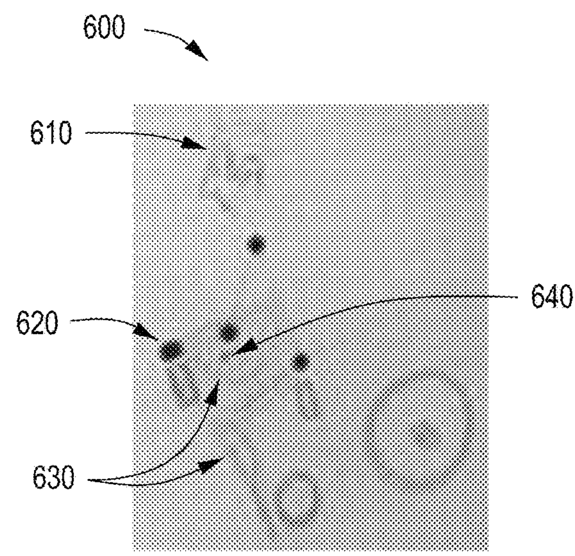

FIG. 6B illustrates a first stage of a conceptual design including manikin 610, a sketch element 625 attached to attachment area 620, void 630, and constraint 640. As described above, responsive to input, problem definition module 134 associates sets of points of sketch 180 with each of void 630, sketch element 625, and constraint 640. In particular, constraint 640 is a rotational constraint that allows void 640 to rotate about attachment area 620.

Figure 6C:
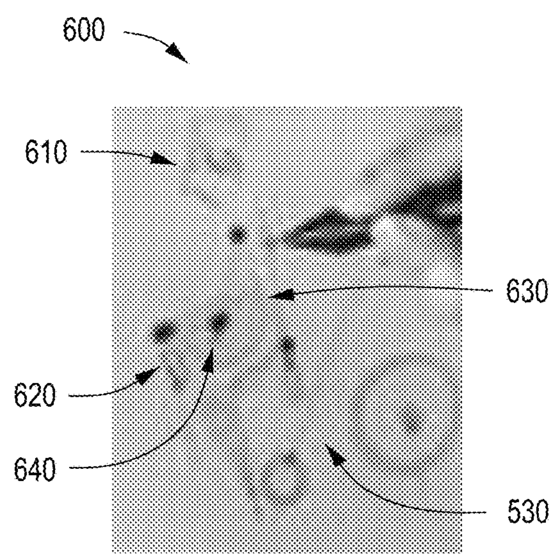

FIG. 6C illustrates a second state of a conceptual drawing on main canvas 600 that includes applied loads 650. As described above, responsive to input, problem definition module 134 associates an applied load to one or more sketch elements. In various embodiments, problem definition module 134 defines sketch elements that are not associated with an applied load as anchor sketch elements, by default. Optimization module 136 may define support structures between one or more anchor sketch elements and each sketch element that is associated with an applied load.

In some embodiments, a designer may determine which sketch elements are designated as anchor sketch elements. Responsive to input, sketch GUI 122 may receive input that indicates a selection of an anchor tool and one or more sketch elements to associate with the anchor tool. Sketch GUI 122 may transmit the input to problem definition module 134. Problem definition module 134 may update database 138 and the problem definition module to designate the user-selected sketch elements as anchor sketch elements.

Figure 6D:
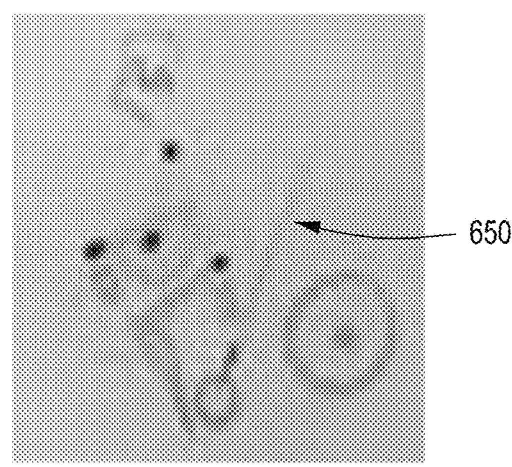
Figure 6E:
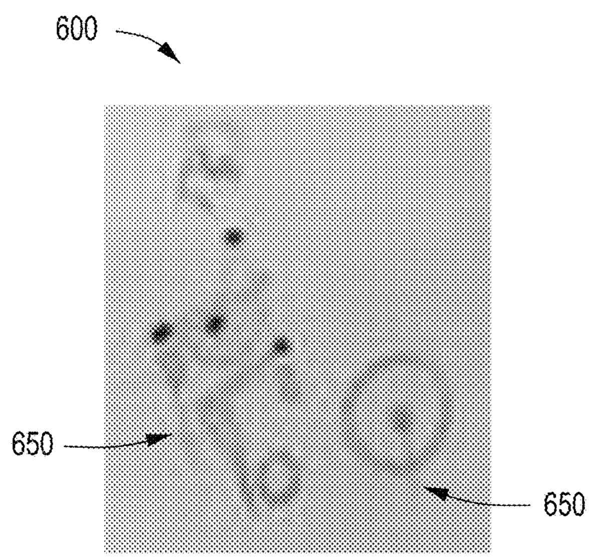

FIGS. 6D-6E illustrate a sequence of applied loads 650 applied to sketch elements in main canvas 600. In various embodiments, a designer may toggle loads 650 applied to sketch elements in main canvas 600. For example, when void 640 is in a first position, a first set of applied loads 650 may be applied to one or more sketch elements. When void 640 is in a second position, a second set of loads 650 may be applied to sketch elements in sketch 180. Responsive to inputs, sketch GUI 122 may receive inputs that indicate that one or more applied loads 650 should be toggled with one or more sketch elements. Sketch GUI 122 may transmit the input to problem definition module 134. Problem definition module 134 may associate a first set of applied loads with a first set of sketch elements in database 138. In addition, problem definition module 134 may associate a second set of applied loads with a second set of sketch elements in database 138. In addition, problem definition module 134 may define a toggle relationship between each set of applied loads and one or more parameter of one or more sketch elements and/or voids in sketch 180. In various embodiments, the parameters include a scale, a position, a rotation, and a state of assembly of the sketch elements and a scale, a position, and a rotation of a void. For example, when a void is in a first position, a first set of loads 650 may be applied to a first set of sketch elements. When the void is in a second position, a second set of loads 650 may be applied to a second set of sketch elements.

In FIG. 6D, the hands of the manikin 610 are retracted and a load 650 is applied to a foot pedal of the bicycle. In FIG. 6E, the hands of the manikin 610 are extended and loads 650 are applied to the handlebars and the back pedal of the bicycle.

In some embodiments, a user may export a data file (e.g., .csv file) that includes one or more applied loads 650 and/or one or more characteristics of an applied load 650, such as a magnitude and/or a direction. Problem definition module 134 may receive the applied loads 650 from the data file and may output the applied loads 650 to sketch GUI 122 for display on main canvas 128. In various embodiments, sketch GUI 122 may display the applied loads 650 with textual tags as a list on main canvas 128. Responsive to user input, sketch GUI 122 may associate one or more applied loads 650 and/or one or more characteristics of an applied load 650 with one or more sketch elements in sketch 180. For example, in response to detecting a dragging event, sketch GUI 122 may transmit an applied load 650 in the displayed list of applied loads 650 that is proximate to the point of origin of the dragging event to problem definition module 134. Sketch GUI 122 may also transmit a sketch element proximate to the point of completion of the dragging event to problem definition module 134. Problem definition module 134 may associate the applied load 650 with the sketch element. In addition, problem definition module 134 may further modify sketch 180 to generate a visual indicator that the applied load 650 is associated with the sketch element. For example, problem definition module 134 may generate an arrow in sketch 180 that is proximate to the sketch element in order to provide a visual indicator that an applied load is being exerted on the sketch element.

As stated above, problem definition module 134 generates a problem definition that includes design relationships between sketch elements, such as constraints and applied loads. Problem definition module 134 transmits the problem definition to optimization module 136. Optimization module 136 processes the problem definition to generate a set of solutions. Each solution may include support structures between each anchor sketch element in sketch 180 and one or more load-bearing sketch elements. Optimization module 136 outputs the set of generated solutions to problem definition module 134.

Figure 6F:
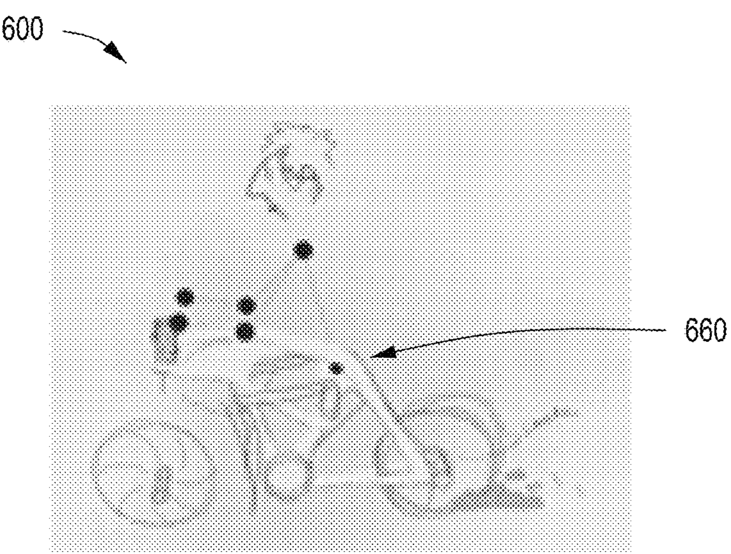
Figure 6G:
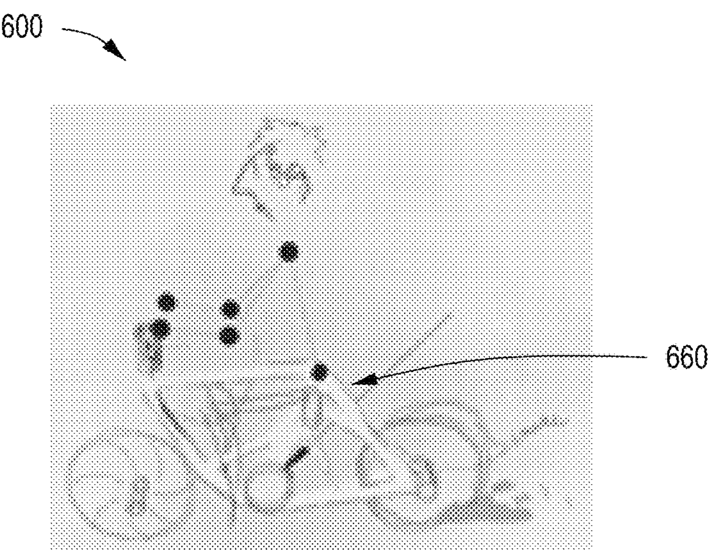

FIGS. 6F-6G illustrates two solutions from the set of solutions outputted by optimization module 136. In particular, in FIG. 6F, the hands of the manikin 610 are extended and loads 650 are applied to the handlebars and the back pedal of the bicycle. Accordingly, support structure 660 is primarily located about the handlebars of bicycle to support the applied load 650. In FIG. 6F, the hands of the manikin 610 are retracted and a load 650 is applied to a foot pedal of the bicycle. Accordingly, optimization module 136 generates support structure 660 that is primarily located around the foot pedal of the bicycle to support the applied load 650.

Figure 7:
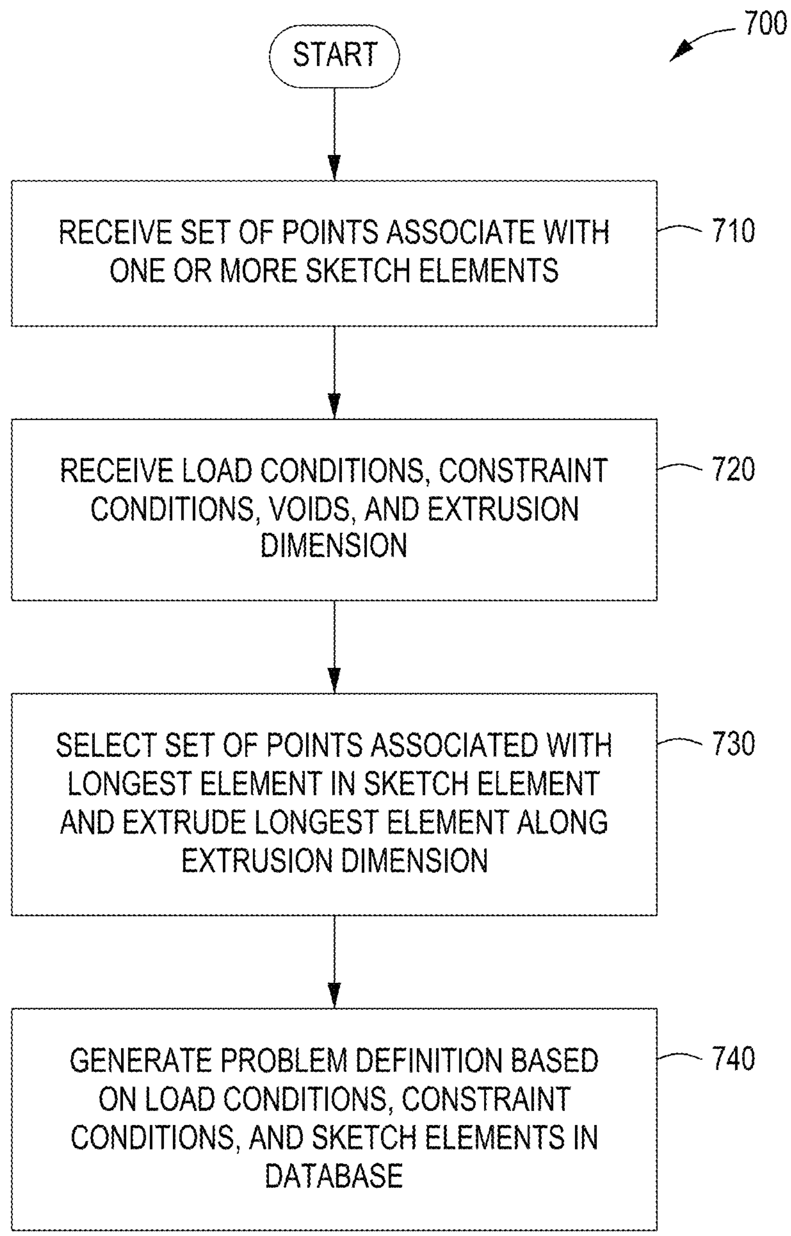
FIG. 7 is a flow diagram of method steps for generating a problem definition based on a sketch, according to various embodiments of the present invention.

FIG. 7 is a flow diagram of method steps for generating a problem definition based on sketch 180, according to various embodiments of the present invention. Although the method steps are described in conjunction with the systems of FIGS. 1, 2A-2E, 3A-3D, 4, 5, and 6A-6G, persons skilled in the art will understand that any system configured to perform the method steps, in any order, is within the scope of the present invention.

As shown, a method 700 begins at step 710, where problem definition module 134 receives a set of points to be designated as a sketch element. A designer may use the patch tool to designate the set of points to be included in a sketch element. The set of points in the sketch element may assume a particular shape and/or may share a common characteristic, such as a fill color.

At step 720, problem definition module 134 receives input that specifies design relationships and extrusion dimension associated with a sketch element. In various embodiments, design relationships include constraints and applied loads. For example, a constraint may associate the position of a first sketch element with a rotation of a second sketch element. In addition, one or more of voids and design aids may be included in sketch 180.

At step 730, problem definition module 134 identifies a set of points associated with a longest element in a sketch element. Problem definition module 134 further extrudes the longest element of the sketch element along the extrusion dimension. In addition, problem definition 134 may replicate sets of points that correspond to illustrative strokes of the sketch element on extrusion faces of the sketch element.

At step 740, problem definition module 134 generates a problem definition based on design relationships and sketch elements. In particular, applied loads, constraints, and voids are included in problem definition. In various embodiments, the problem definition captures the engineering design requirements specified by the designer in sketch 180.

Figure 8:
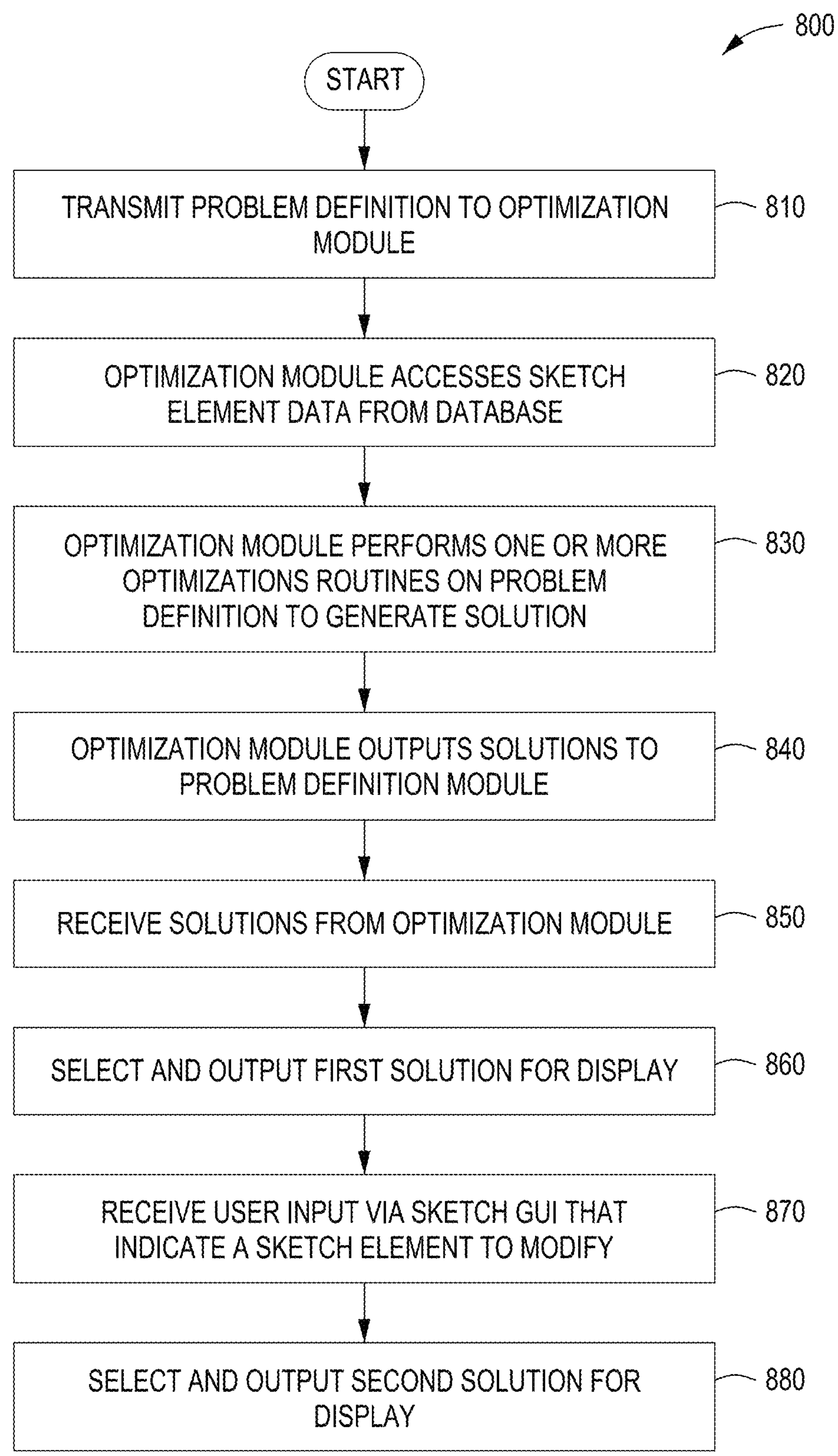
FIG. 8 is a flow diagram of method steps for generating and displaying a solution to a problem definition, according to various embodiments of the present invention.

FIG. 8 is a flow diagram of method steps for generating and displaying a solution to a problem definition, according to various embodiments of the present invention. Although the method steps are described in conjunction with the systems of FIGS. 1, 2A-2E, 3A-3D, 4, 5, and 6A-6G, persons skilled in the art will understand that any system configured to perform the method steps, in any order, is within the scope of the present invention.

As shown, a method 800 begins at step 810, where problem definition module 134 generates problem definition based on sketch elements and associated design relationships. In various embodiments, problem definition module 134 transmits the problem definition module 134 to optimization module 136.

At step 820, optimization module 136 performs one or more optimization routines on the problem definition in order to generate solutions. For example, optimization module 136 may generate a modified problem definition by restricting the domain of each primary sketch element associated with a constraint. Optimization engine may further perform a topology optimization routine on each modified problem definition to generate a problem solution. Optimization module 136 further outputs a set of solutions to problem definition module 134 for display.

At set 830, problem definition module 134 selects and outputs a first solution for display. At step 840, problem definition module 134 receives user input via sketch GUI 122 that indicates that a sketch element in sketch 180 should be modified. For example, sketch GUI 122 may receive input that indicates a dragging event that starts proximate to a first sketch element and moves along a movement path of that sketch element.

At step 850, problem definition module 134 selects and outputs a second solution for display. In various embodiments, responsive to input, problem definition module 134 searches through the set of solutions to find a solution that most closely matches the modified position of the sketch element modified based on user input.

In addition, a user may add and/or remove sketch elements from sketch 180. In response, problem definition module 134 may modify the problem definition and transmit the modified problem definition to optimization module 136. Optimization module 136 may generate a second set of solutions and output the second set of solutions to the problem definition module 134. In response, the problem definition module 134 may select a solution from the second set of solutions and output the selected solution to sketch GUI 122 for display.

In sum, a sketch application enables a designer to generate a sketch on a main canvas. The designer provides input that specifies one or more sketch elements for display. In addition, the designer specifies design relationships between various sketch elements in a sketch. A problem definition module receives input data via a sketch GUI that specifies one or more sets of points to designate as sketch elements and at least one design relationship, such as a load applied to a sketch element. The problem definition module generates a problem definition based on the input data and transmits the problem definition to the optimization module. The optimization module implements one or more algorithms to generate a set of solutions to the problem definition. The optimization module transmits the set of solutions to the problem definition module. The problem definition module selects and outputs a solution for display. Responsive to user input, the problem definition module selects a second solution from the solution set for display.

At least one advantage of the disclosed approach is that the sketch application converts vague conceptual designs into structurally sound engineering models. Accordingly, a designer can fully engage in design ideation without focusing on generating a structurally sound engineering model. Further, a designer can iteratively modify a given engineering model to discover a design that is aesthetically pleasing and structurally sound.

1. In some embodiments, a computer-implemented method for generating a three-dimensional model from a two-dimensional sketch, the method comprising: receiving input indicating a set of points defining a first sketch element and a second set of points defining a second sketch element included in a sketch; identifying one or more design relationships between the first sketch element and the second sketch element; generating a computer model of the sketch that represents a structure linking the first sketch element and the second sketch element according to the one or more design relationships; and outputting the first sketch element, the second sketch element, and the structure for display.

2. The computer-implemented method of clause 1, wherein the set of points comprises a two-dimensional graphics object.

3. The computer-implemented method of clauses 1 or 2, wherein the design relationship comprises a functional relationship between at least one of a scale, a position, an orientation, and a state of assembly of the first sketch element and the second sketch element.

4. The computer-implemented method of clauses 1-3, wherein the design relationship comprises designating the first sketch element as a load-bearing sketch element and the second sketch element as an anchor sketch element, wherein an applied load is associated with the load-bearing sketch element.

5. The computer-implemented method of clauses 1-4, further comprising a void that designates an area that does not intersect the structure.

6. The computer-implemented method of clauses 1-5, wherein at least one of the first sketch element and the second sketch element are extruded along an extrusion dimension.

7. The computer-implemented method of clauses 1-6, wherein the design relationship comprises a design aid that indicates a preferred spatial separation between the first sketch element and a third sketch element included in the sketch.

8. The computer-implemented method of clauses 1-7, wherein at least one of the one or more design relationships and at least one of a position, a size, and a shape of each of the first sketch element and the second sketch element are converted into a problem definition, and wherein the computer model is generated based on the problem definition.

9. In some embodiments, a non-transitory computer-readable medium storing program instructions that, when executed by a processor, cause the processor to generate a three-dimensional model from a two-dimensional sketch by performing the steps of: receiving input indicating a set of points defining a first sketch element and a second set of points defining a second sketch element included in a sketch; identifying one or more design relationships between the first sketch element and the second sketch element; generating a computer model of the sketch that represents a structure linking the first sketch element and the second sketch element according to the one or more design relationships; and outputting the first sketch element, the second sketch element, and the structure for display.

10. The non-transitory computer-readable medium of clause 9, wherein the set of points comprises a two-dimensional graphics object.

11. The non-transitory computer-readable medium of clauses 9 or 10, wherein the design relationship comprises a constraint that defines a functional relationship between at least one of a scale, a position, an orientation, and a state of assembly of the first sketch element and the second sketch element.

12. The non-transitory computer-readable medium of clauses 9-11, wherein the design relationship comprises designating the first sketch element as a load-bearing sketch element and the second sketch element as an anchor sketch element, wherein an applied load is associated with the load-bearing sketch element.

13. The non-transitory computer-readable medium of clauses 9-12, further comprising a void, wherein the void designates a third set of points that do not intersect the structure.

14. The non-transitory computer-readable medium of clauses 9-13, wherein at least one of the first sketch element and the second sketch element are extruded along an extrusion dimension.

15. The non-transitory computer-readable medium of clauses 9-14, wherein the design relationship comprises a design aid that indicates a preferred spatial separation between the first sketch element and a third sketch element.

16. The non-transitory computer-readable medium of clauses 9-15, wherein at least one of the one or more design relationships and at least one of a position, a size, and a shape of each of the first sketch element and the second sketch element are converted into a problem definition, wherein the computer model is generated based on the problem definition.

17. In some embodiments, a system, comprising: a memory storing a sketch application; and a processor that, upon executing the sketch application, is configured to: receive input indicating a set of points defining a first sketch element and a second set of points defining a second sketch element included in a sketch; identify one or more design relationships between the first sketch element and the second sketch element; generate a computer model of the sketch that represents a structure linking the first sketch element and the second sketch element according to the one or more design relationships; and output the first sketch element, the second sketch element, and the structure for display.

18. The system of clause 17, wherein the design relationship comprises a constraint that defines a functional relationship between at least one of a scale, a position, an orientation, and a state of assembly of the first sketch element and the second sketch element.

19. The system of clauses 17 or 18, wherein the design relationship comprises designating the first sketch element as a load-bearing sketch element and the second sketch element as an anchor sketch element, wherein an applied load is associated with the load-bearing sketch element.

20. The system of clauses 17-19, wherein at least one of the one or more design relationships and at least one of a position, a size, and a shape of each of the first sketch element and the second sketch element are converted into a problem definition, wherein the computer model is generated based on the problem definition.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a “module” or “system.” Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for generating a three-dimensional model from a two-dimensional sketch, the method comprising:

generating, based on a two-dimensional sketch, a problem definition comprising a non-linear constraint relationship between a first sketch element comprising a first set of two-dimensional points and a second sketch element comprising a second-set of two-dimensional points included in the two-dimensional sketch, wherein the non-linear constraint relationship comprises a non-linear function that relates a first parameter of the first sketch element with a second parameter of the second sketch element;

generating a three-dimensional computer model comprising a modification to one or more two-dimensional points in at least one of the first sketch element and the second sketch element to satisfy the non-linear constraint relationship; and causing the three-dimensional computer model to be displayed.

2. The computer-implemented method of claim 1, further comprising:

identifying a design relationship that relates at least one of a scale, a position, an orientation, or a state of assembly of the first sketch element to at least one of a scale, a position, an orientation, or a state of assembly of the second sketch element; and generating the three-dimensional computer model to satisfy the design relationship.

3. The computer-implemented method of claim 1, further comprising:

designating, based on the two-dimensional sketch, the first sketch element as a load-bearing sketch element;

designating, based on the two-dimensional sketch, the second sketch element as an anchor sketch element that provides structural support to the load-bearing sketch element; and generating the problem definition and the three-dimensional computer model to satisfy an applied load associated with the load-bearing sketch element.

4. The computer-implemented method of claim 3, wherein generating the three-dimensional computer model comprises maximizing a stiffness of the second sketch element to support the applied load exerted on the first sketch element.

5. The computer-implemented method of claim 1, further comprising:

identifying, based on the two-dimensional sketch, a design relationship between the first sketch element and the second sketch element that comprises a void that designates an area that does not intersect either the first sketch element or the second sketch element; and generating the three-dimensional computer model to include a support structure that connects the first sketch element and the sketch element and deforms to exclude one or more two-dimensional points in the first sketch element or the second sketch element from the void.

6. The computer-implemented method of claim 1, wherein generating the three-dimensional computer model comprises extruding a set of two-dimensional points associated with a longest line in at least one of the first sketch element or the second sketch element along an extrusion dimension up to an extrusion length.

7. The computer-implemented method of claim 1, further comprising identifying a design relationship between the first sketch element and the second sketch element that comprises a design aid that indicates a preferred spatial separation between the first sketch element and a third sketch element included in the sketch, wherein the three-dimensional computer model is further generated based on the design relationship.

8. A non-transitory computer-readable medium storing program instructions that, when executed by a processor, cause the processor to perform the steps of:

generating, based on a two-dimensional sketch, a problem definition comprising a non-linear constraint relationship and an applied load relationship between a first sketch element comprising a first set of two-dimensional points and a second sketch element comprising a second-set of two-dimensional points included in the two-dimensional sketch, wherein the non-linear constraint relationship comprises a non-linear function that relates a first parameter of the first sketch element with a second parameter of the second sketch element and the applied load relationship comprises an applied load exerted on the first sketch element that is designated as a load-bearing sketch element;

generating a three-dimensional computer model comprising a modification to one or more two-dimensional points in at least one of the first sketch element and the second sketch element to satisfy the non-linear constraint relationship and the applied load relationship; and causing the three-dimensional computer model to be displayed.

9. The non-transitory computer-readable medium of claim 8, the steps further comprising identifying a design relationship between the first sketch element and the second sketch element that comprises a constraint between at least one of a scale, a position, an orientation, or a state of assembly of the first sketch element and at least one of a scale, a position, an orientation, or a state of assembly of the second sketch element, wherein the three-dimensional computer model is further generated based on the design relationship.

10. The non-transitory computer-readable medium of claim 8, wherein the applied load relationships designates the second sketch element as an anchor sketch element that provides structural support to the load-bearing sketch element.

11. The non-transitory computer-readable medium of claim 8, wherein generating the three-dimensional computer model comprises extruding a set of points associated with a longest line in at least one of the first sketch element or the second sketch element along an extrusion dimension up to an extrusion length.

12. The non-transitory computer-readable medium of claim 8, the steps further comprising identifying a design relationship between the first sketch element and the second sketch element that comprises a design aid in the form of a manikin that indicates a spatial displacement between various parts of a body, wherein the three-dimensional computer model is further generated based on the design relationship.

13. The non-transitory computer-readable medium of claim 8, the steps further comprising:

identifying a design relationship between at least one of a position, a size, or a shape of the first sketch element and at least one of a position, a size, or a shape of the second sketch element; and adding the design relationship to the problem definition, wherein the three-dimensional computer model is generated based on the problem definition.

14. The non-transitory computer-readable medium of claim 8, wherein generating the three-dimensional computer model comprises maximizing a stiffness of the second sketch element to support the applied load exerted on the first sketch element.

15. The non-transitory computer-readable medium of claim 8, the steps further comprising:

identifying, based on the two-dimensional sketch, a design relationship between the first sketch element and the second sketch element that comprises a void that designates an area that does not intersect either the first sketch element or the second sketch element; and generating the three-dimensional computer model to include a support structure that connects the first sketch element and the sketch element and deforms to exclude one or more points in the first sketch element or the second sketch element from the void.

16. A system, comprising:

a memory storing instructions; and a processor that, when executing the instructions, is configured to:

generate, based on a two-dimensional sketch, a problem definition comprising an applied load relationship between a first sketch element comprising a first set of two-dimensional points and a second sketch element comprising a second-set of two-dimensional points, wherein the applied load relationship specifies the first sketch element as a load-bearing element and the second sketch element as an anchor sketch element that provides structural support to the load-bearing sketch element;

generate a three-dimensional computer model comprising a modification to one or more two-dimensional points in at least one of the first sketch element and the second sketch element to satisfy the applied load relationship; and cause the three-dimensional computer model to be displayed.

17. The system of claim 16, wherein, when executing the instructions, the processor is further configured to:

identify a design relationship between at least one of a position, a size, or a shape of the first sketch element and at least one of a position, a size, or a shape of the second sketch element; and add the design relationship to the problem definition, wherein the three-dimensional computer model is generated based on the problem definition.

* * * * *